Figure 1:
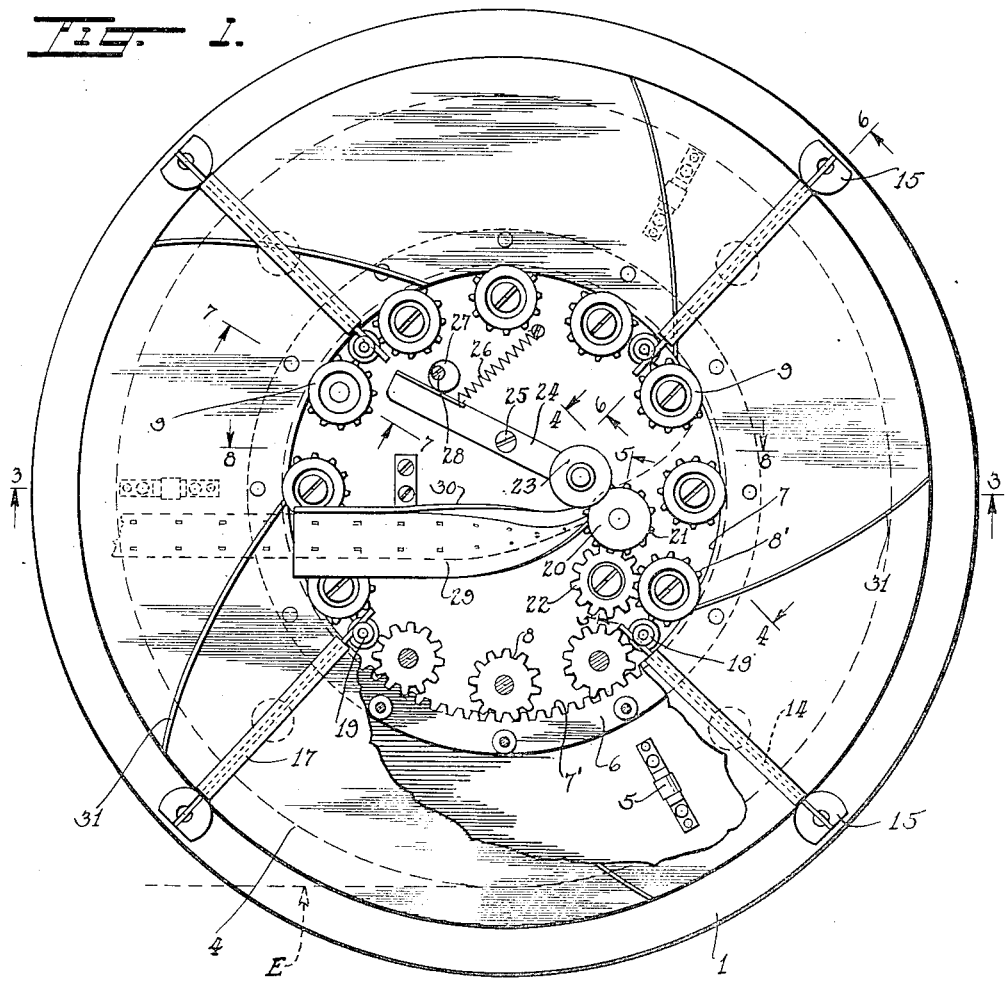

Oct. 27, 1931.                W. G. KING ET AL                 1,829,095
                                  FILM REEL
                              Filed June 10, 1929            2 Sheets-Sheet 1

INVENTORS
W. G. King
M. E. Krause
BY
ATTORNEYS

Oct. 27, 1931.                W. G. KING ET AL                1,829,095
                                FILM REEL
                           Filed June 10, 1929           2 Sheets-Sheet 2
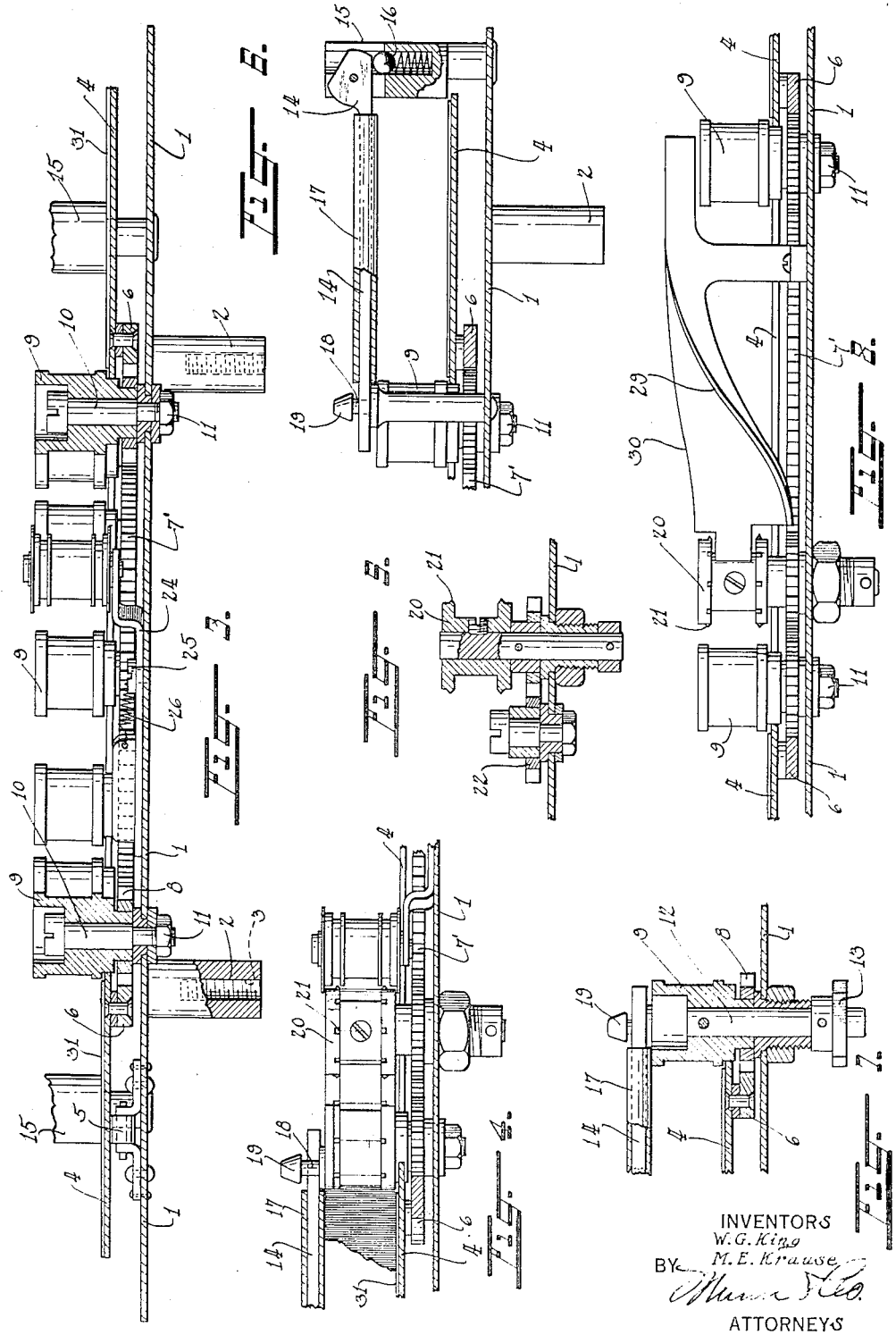
INVENTORS
W. G. King
M. E. Krause
BY
ATTORNEYS Patented Oct. 27, 1931

1,829,095

UNITED STATES PATENT OFFICE

WALTER G. KING AND MAX E. KRAUSE, OF CHICAGO, ILLINOIS

FILM REEL

Application filed June 10, 1929. Serial No. 369,663.

Our invention relates to improvements in film reels, and it consists in the combinations, constructions, and arrangements herein described and claimed.

An object of our invention is to provide a film reel which has novel means for driving the circularly-grouped rollers contacting with the flat surface of the film at the inner convolution of a roll of film and also driving the film-supporting plate or surface against which the edges of the convolutions of the film rest. With this construction the friction between the film and the means for supporting and retaining the film in an operative position is reduced to a minimum thus obviating possibilities for film breakage.

A further object of our invention is to provide a device of the type described with a means for safely and operatively holding the film in position with relation to the circularly-grouped rollers within the convolution of film and the film-supporting plate or surface.

A further object of our invention is to provide a device of the type described by means of which an endless film may move continuously or intermittently in a continuous path from the inner convolution of a roll of film revolving about the circularly-grouped rollers onward through the mechanism of a projector and past the lens and back on to the outer convolution of a roll of film without undue strain or intricate twists or loops in the film.

A further object of our invention is to provide a device of the type described by means of which the film may be disposed in a horizontal, vertical or inclined position, in any of which positions the film and the device will work equally efficient.

A further object of our invention is to provide a device of the type described wherein a film may be readily inserted and readily taken off, without requiring great mechanical skill or aptitude in these operations.

A further object of our invention is to provide a device of the type described wherein all parts of similar nature or construction are standardized and readily interchangeable.

A further object of our invention is to provide a device of the type described by means of which the film and the film reel may readily be detached, as a unit, from a projector and be attached to any other projector of similar make.

A further object of our invention is to provide a device of the type described wherein the movement of all film-contacting parts of the device and the film-contacting parts of the projector wherein the device is used are synchronized thus eliminating possibilities of film breakage in the process of moving the film from the device, through and past the projector, and back to and on the film reel.

A further object of our invention is to provide a device of the type described which will readily and efficiently drive, support and handle other strips or sections of materials of a nature or usage similar to projection film.

A further object of our invention is to provide a device of the type described which will drive and operatively retain strips or sections of matter or materials whereby characters, images or letters perforated in or imprinted or embossed on such strips or sections or matter or materials may be projected, shown, or displayed repeatedly, as in a continuous picture projecting machine or other device for projecting, showing or displaying such characters, images, or letters.

Other objects and advantages will appear in the following specification, and the novel features of the invention will be particularly pointed out in the appended claims.

Figure 2:
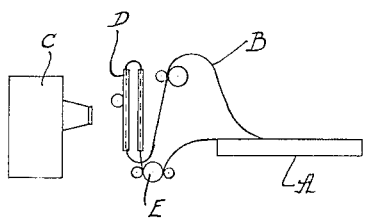

Our invention is illustrated in the accompanying drawings, forming part of this application, in which Figure 1 is a top plan view of the reel, a portion thereof being broken away, Figure 2 is a diagrammatic illustration of the projector, Figure 3 is a section along the line 3—3 of Figure 1, Figure 4 is a section along the line 4—4 of Figure 1, Figure 5 is a section along the line 5—5 of Figure 1, Figure 6 is a section along the line 6—6 of Figure 1, Figure 7 is a section along the line 7—7 of Figure 1, and Figure 8 is a side elevation of the film travel guide and the adjacent parts.

In carrying out our invention we provide a base 1 which is provided with supports 2, see Figure 3, which are provided with internally threaded portions 3 for securing the base within a housing not shown. A revolving supporting plate or disc 4 is disposed parallel with the base 1 and is mounted upon spaced-apart supporting rollers 5. A ring gear 6 is rigidly secured to the supporting plate 4 adjacent the opening 7 which is provided in the supporting plate. The teeth 7' of the ring gear are in mesh with a plurality of spaced apart gears 8 which are rigidly mounted upon film spools 9. The film spools 9 are rotatably mounted upon spool shafts 10 which are rigidly secured to the base 1 as at 11.

One of the spools 9, see Figure 7, is mounted upon a clutch shaft 12 which has a separable power transmission unit 13 carried thereby and disposed upon the opposite side of the base 1 from that of the spool 9. A plurality of film guard arms 14 are pivotally mounted upon the film guard posts 15 which are rigidly mounted upon the base 1, see Figure 6. The arms 15 have their outer ends normally held in a position parallel with the supporting plate 4 by means of spring-pressed balls 16. Guard rollers 17 are rotatably disposed upon the arms 14. The inner ends of the arms 14 are held beneath the edges 18 of conical-shaped retaining members 19 which are mounted upon the base 1.

A feed sprocket 20 is rotatably mounted upon the base 1 and has a gear 21 mounted thereupon, which is in mesh with an idler gear 22, the idler gear in turn being in mesh with the adjacent gear 8, which is indicated in Figure 1 as 8'. A detailed view of the feed sprocket and the adjacent mechanism is shown in Figure 5.

A guard roller 23 is rotatably mounted upon a guard arm 24 which is pivotally secured to the base 1 as at 25. A tension spring 26 is operatively connected to the guard arm for normally holding the guard roller 23 in close proximity to the feed sprocket 20. An adjustable eccentric stop member 27 is adjustably secured to the base 1 by means of a screw 28. A travel guide 29 is rigidly mounted upon the base 1 and has one end disposed adjacent the feed sprocket 20, see Figures 1 and 8. The guide 29 is provided with an arcuate-shaped flange 30 for holding the film in place.

From the foregoing description of the various parts of the device, the operation thereof may be readily understood. In Figure 2 there is shown a diagrammatic illustration of the film reel which is indicated at A, the film which is indicated at B, and the projector which is indicated at C. During the operation of the device power is transmitted to the shaft 12 through the power transmission unit 13 thus rotating the gear 8 which is rigidly carried by the spool 9 which is mounted upon the shaft 12 and in turn imparting a rotating movement to the supporting plate 4. In this manner the spools 9, due to their operative connection with the ring gear 6, are rotated in unison. The film B, which is mounted upon the spools 9 and rests upon film supporting ribs 31 which are integral with the supporting plate, is rotated by the rotation of the spools 9 and the supporting plate 4.

The film from the inner convolution passes between the feed sprocket 20 and the guard roller 23 where it is held in connection with the teeth upon the feed sprocket. As the film passes between the sprocket 20 and the roller 23 it moves upwardly upon the guide 29 where it is taken over the main body of film and passes through the film projector head mechanism indicated at D, and brought back to the reel where it passes upon the outer convolution as indicated at E. During this movement of the film it will be observed that the film is constantly driven and there is no strain or pull whatsoever upon the film. Not only is the supporting means disposed adjacent the inner convolution of the film actuated so as to impart a rotative movement to the film, but the supporting plate which supports the film from the side is also moved or rotated so as to obviate any frictional contact with the film which is caused by the movement of the film over a stationary portion of the film reel.

Furthermore, with this construction the film may be moved in a continuous path without twisting the film so as to cause breakage thereof.

By adjusting the eccentric stop member 27 the tension or force of the guard roller 23 upon the film, for holding the film adjacent the sprocket roller 20, may be varied. The ribs 31 are so constructed and so curved that they tend to hold the film toward the center. This is brought about by the curvature of the ribs extending somewhat toward the path of rotation. The rollers 17, upon the arms 14, provide a frictionless means for the film when the film reel is held in a vertical or slanting position.

In Figure 3 it will be noted that the rollers 9 are disposed in frictional engagement with the supporting means or ring 4. In this manner an operative engagement is provided between these members tending to provide a uniform movement of the film.

We claim:

1. A film reel comprising a normally stationary plate, a rotatable film-supporting plate mounted upon the supporting plate and in close proximity thereto, bearing means disposed between said plates, said film-supporting plate being provided with an opening, a plurality of film spools provided with gears and mounted upon said supporting plate, said film spools being positioned within the opening in the film-supporting plate and adjacent the edge of the opening, the spools being provided with flanges projecting beyond the edge of the opening, a gear secured to the movable film-supporting plate and arranged in mesh with the gears associated with said spools, said gear being positioned between the film-supporting plate and said supporting plate, one of said film spools being connectible with a source of power, a film feeding sprocket mounted upon said supporting plate and positioned within the opening in the film-supporting plate, a connecting element between the film feeding sprocket, a gear associated with one of said film sprockets, and a guard roller mounted upon the supporting plate and positioned within the opening in said rotatable film-supporting plate, said guard roller being arranged in operative relation with said film feeding sprocket and provided with an eccentric adjusting device.

2. A film reel comprising a normally stationary plate, a rotatable film-supporting plate mounted upon the supporting plate and in close proximity thereto, bearing means disposed between said plates, said film-supporting plate being provided with an opening, a plurality of film spools provided with gears and mounted upon said supporting plate, said film spools being positioned within the opening in the film-supporting plate and adjacent the edge of the opening, the spools being provided with flanges projecting beyond the edge of the opening, a gear secured to the movable film-supporting plate and arranged in mesh with the gears associated with said spools, said gear being positioned between the film-supporting plate and said supporting plate, one of said film spools being connectible with a source of power, said rotatable film-supporting plate being arranged to support a film spirally wound thereon, the inner convolution of said spirally wound film being positioned contiguous to said film spools, a plurality of guard rollers radially aligned and having their outer ends pivotally connected upon supports fixed to said supporting plate, and a plurality of retaining elements fixed upon said supporting plate and being provided with head portions adapted to positively hold the guard rollers in parallel relation with said rotatable film-supporting plate.

3. A film reel comprising a normally stationary plate, a rotatable film-supporting plate mounted upon the supporting plate and in close proximity thereto, bearing means disposed between said plates, said film-supporting plate being provided with an opening, a plurality of film spools provided with gears and mounted upon said supporting plate, said film spools being positioned within the opening in the film-supporting plate and adjacent the edge of the opening, the spools being provided with flanges projecting beyond the edge of the opening, a gear secured to the movable film-supporting plate and arranged in mesh with the gears associated with said spools, said gear being positioned between the film-supporting plate and said supporting plate, one of said film spools being connectible with a source of power, a plurality of guard rollers pivotally connected with fixed supports mounted upon said supporting plate, and a plurality of elements having head portions arranged for positively holding the guard rollers in parallelism with the rotatable film-supporting plate.

4. A film reel comprising a normally stationary plate, a rotatable film-supporting plate mounted upon the supporting plate and in close proximity thereto, bearing means disposed between said plates, said film-supporting plate being provided with an opening, a plurality of film spools provided with gears and mounted upon said supporting plate, said film spools being positioned within the opening in the film-supporting plate and adjacent the edge of the opening, the spools being provided with flanges projecting beyond the edge of the opening, a gear secured to the movable film-supporting plate and arranged in mesh with the gears associated with said spools, said gear being positioned between the film-supporting plate and said supporting plate, one of said film spools being connectible with a source of power, a plurality of guard rollers pivotally connected with fixed supports mounted upon said supporting plate, a plurality of elements having head portions arranged for positively holding the guard rollers in parallelism with the rotatable film-supporting plate, and spring means for yieldingly holding the guard rollers in closed and opened positions.

5. In a film reel, a supporting plate, a film-supporting plate positioned in operative relation with the former, a hollow support secured to the supporting plate and having a slot in its side, a film guard having one end positioned within the slot and pivotally connected with the hollow support, spring means disposed within the latter and engaging a portion of the film guard for yieldingly holding the latter in predetermined positions, and means for positively holding the film guard in parallelism with the film-supporting plate.

6. In a film reel, a supporting plate, a film-supporting plate positioned in operative relation with the former, a hollow support secured to the supporting plate and having a slot in its side, a film guard having one end positioned within the slot and pivotally connected with the hollow support, spring means disposed within the latter and engaging a portion of the film guard for yieldingly holding the latter in predetermined positions, and means for positively holding the film guard in parallelism with the film-supporting plate, said film guard being adapted to be flexed for movement out of engagement with said last named means.

7. In a film reel, a supporting plate, a film-supporting plate positioned in operative relation with the former, a plurality of fixed supports associated with said supporting plate, film guards movably connected with said fixed supports, spring means associated with the fixed supports for yieldingly holding the film guards in predetermined positions, and a plurality of guard retaining elements mounted upon the supporting plate and provided with head means for positively holding the film guards in parallelism with the film-supporting plate.

Signed at Chicago, in the county of Cook and State of Illinois, this 6th day of June, A. D. 1929.

WALTER G. KING.
MAX E. KRAUSE.